No. 889,442. PATENTED JUNE 2, 1908.
F. B. COOK.
CABLE TERMINAL.
APPLICATION FILED NOV. 2, 1907.

WITNESSES: Frederick R. Parker, C. C. Newburn

INVENTOR: Frank B. Cook.

UNITED STATES PATENT OFFICE.

FRANK B. COOK, OF CHICAGO, ILLINOIS.

CABLE-TERMINAL.

No. 889,442.

Specification of Letters Patent.

Patented June 2, 1908.

Application filed November 2, 1907. Serial No. 400,390.

*To all whom it may concern:*

Be it known that I, FRANK B. COOK, a citizen of the United States of America, residing at Chicago, in the county of Cook and State of Illinois, have invented a new and useful Cable-Terminal, of which the following is a specification, reference being had to the accompanying drawings, illustrating same.

My invention relates to cable terminals used for distributing and protecting the conductors of electrical cables.

The principal objects of my invention are to provide a cable terminal from which drop-wires may be extended in various directions, the parts of which may be readily gotten at by a lineman without requiring the lineman to crawl through the drop-wires when the cable terminal is mounted on a pole; to provide improved means for mounting such a cable terminal to a pole; to provide an improved arrangement of the protective apparatus carried by the cable terminal; to provide an improved cover for such a cable terminal and improved means for holding the cover in place; to provide improved means for connecting the cable and aerial conductors with the protective apparatus; and to provide an improved form of inclosure in which the protective apparatus is contained.

Other objects will be apparent from the following specification.

With numerous forms of cable terminals now in use it is necessary for a lineman to crawl through the drop-wires extending from the cable terminal, or from a distributing ring, in order to get at the protective apparatus carried by the cable terminal. This is very inconvenient and also very injurious to the drop-wires. The cable terminal of my present invention is designed so as to place the drop-wire distributing ring at the top of the terminal and the protective apparatus and body of the terminal below the said distributing ring so that a lineman does not have to crawl through the drop-wires to get at the protective apparatus or the various parts of the cable terminal. In such a cable terminal the cover is lowered when it is desired to get at the protective apparatus, instead of being raised as is generally the case, especially in terminals used for telephone work.

Figure 1:
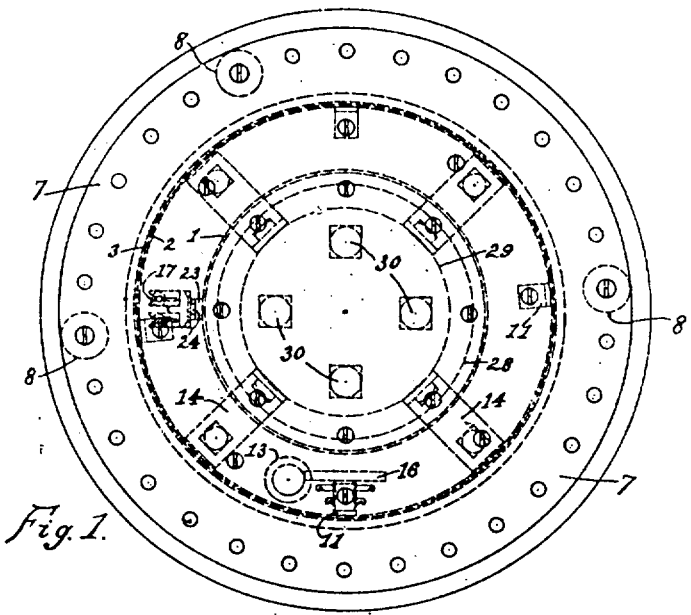
Figure 2:
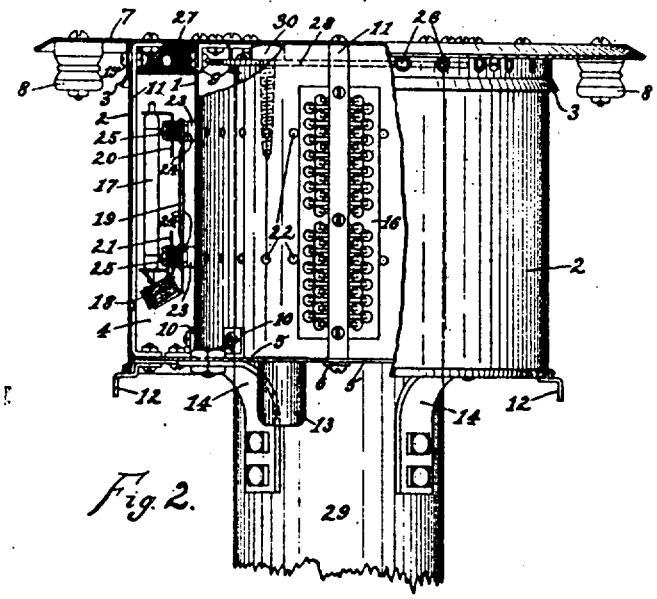

In the accompanying drawings Figure 1 is a plan view of the cable terminal of my present invention, with numerous interior portions thereof shown in dotted lines; and Fig. 2 is an elevation of the cable terminal shown in Fig. 1, with portions removed to show the interior construction.

Like characters refer to like parts in the several figures.

The cable terminal illustrated comprises two concentric sheet-metal drums 1 and 2, the inner drum 1 being adapted for carrying the protective apparatus of the cable terminal which is employed for protecting the various cable conductors, and the outer drum 2 being movable downward from the position shown in Fig. 2 so as to expose the protective apparatus which is carried in the annular inclosure 4 between the drums 1 and 2 as desired. At the upper end of the cover 2 is provided an annular drip 3 within the lower end of which is placed the upper end of the cover 2 when the latter is in place to inclose the protective apparatus. At the bottom of the annular inclosure 4 is provided a flat ring, constructed of several sheet-metal portions 5 5 fastened together as at 6, to close the lower end of the annular inclosure 4. The upper end of the annular inclosure 4 is covered by a flat sheet-metal disk 7 which extends entirely over the cable terminal and provides a ring outside of the cable terminal to which ring are secured insulators 8 8 as desired. These insulators are for supporting the drop-wires leading from the cable terminal. The inner drum 1 is secured to the top plate 7 by suitable angles 9 9. The bottom ring 5 is supported by suitable angles 10 10 secured to the ring 5 and the drum 1 and also by several vertical strips 11 11 which are suitably secured to the top plate 7 and to the bottom ring 5, these strips 11 11 also serving as guides for the outer drum or cover 2 when the latter is raised or lowered. On the bottom ring 5 are provided catches 12 12 to hold the cover 2 in place when same is in its raised position, the said catches being pivoted so as to be turned inwardly to allow the cover 2 to be lowered when desired. The bottom ring 5 is also provided with a nozzle 13, preferably a self-soldering nozzle, for securing the end of a cable, or a pot-head, in position and allowing the conductors of the cable or pot-head to enter the annular inclosure 4 to be distributed and connected with the protective apparatus. The bottom ring 5 also carries a number of brackets 14 14 adapted to be bolted to a pole or other suitable support, preferably as shown in Fig. 2. The annular drip 3 is suitably bolted to the vertical guides 11 11 for support, there being preferably a washer 15 between each guide 11 and the drip 3 to provide suitable space for the upper edge of the drum 2 and the insulating strips 27 27, preferably as shown in Fig. 2. One of the vertical guides 11 preferably carries a distributing strip 16 which is employed for distributing the cable conductors within the annular inclosure 4 when the cable is extended up through the nozzle 13.

The protective apparatus preferably used in this cable terminal is of the individual-unit type, each unit preferably comprising a pair of fuses 17 17 and a pair of lightning arresters 18 18 suitably mounted on a sheet-metal base-portion 19. The base-portion 19 preferably provides a ground for the lightning arresters 18 18. The fuses 17 17 are carried by spring-members 20 and 21 which are suitably insulated from the sheet-metal base-portion 19. The inner drum 1 is preferably provided with series of holes 22 22 through which suitable bolts are extended outwardly, the said bolts being rigidly secured to the drum 1 by metallic washers 23 23 and nuts 24 24. An individual protector unit may be mounted upon a pair of these bolts by nuts 25 25, when desired, as shown on the left-hand side of Fig. 2, preferably in a vertical position. As the sheet-metal protector mounting portions 19 19 are metallically connected with the drum 1, it is only necessary to ground the sheet-metal drum 1 in order to provide a ground connection for all of the lightning arresters 18 18. The protector mounting strips 19 19 are spaced from the drum 1 preferably as shown, so as to provide an annular space between the drum 1 and the portions 19 19 in which space the cable conductors or aerial conductors may be extended around the drum 1 as desired, to the proper protector units. The cable conductors and aerial conductors may also be extended around the drum 1 at other portions of the annular inclosure 4 if desired.

The aerial conductors preferably extend from the insulators 8 8 through holes 26 26 in the annular drip-portion 3 to terminal portions 20 20 of the protector units, there being an insulating ring 27 secured to the inner side of the annular portion 3 and provided with a series of holes coinciding with holes 26 26 in the portion 3 but somewhat smaller than the latter said holes so as to suitably insulate the aerial conductors from the sheet-metal portion 3 where they pass through the latter; the cable conductors enter the annular inclosure 4 through the nozzle 13 and are distributed to the distributing strip 16. The cross-connecting conductors are connected from the distributing strip 16 to terminal portions 21 21 of the protector units, thereby connecting the cable conductors through the protector units with the aerial conductors.

It will be readily understood that the protector units and the insulators 8 8 may be mounted in place as it is desired to utilize them, it not being necessary to equip the drum 1 with its full capacity of protector units, or the top plate 7 with its full capacity of insulators 8 8, to properly utilize the cable terminal.

The cable terminal, as above described, is mounted to a pole as follows:—First a heavy circular plate 28 is bolted to the top of the pole 29 by lag screws 30 30. Then the cable terminal as a whole is placed over the top of the pole and over the circular plate 28 preferably as shown in Fig. 2, the inner drum 1 sliding down over the circular plate 28, and then the brackets 14 14 are suitably bolted to the sides of the pole so as to securely mount the lower portion of the cable terminal to the pole and hold the cable terminal as a whole down over the circular plate 28 which provides a rigid support for the upper portion of the cable terminal. This construction thoroughly protects the top end of the pole 29 from the weather, as there are no bolt-holes extending through the top plate 7 to the pole 29 or to the inner portion of drum 1, the portions 1, 2, 3, 5, 7, 9 9, 10 10, 11 11, 13 and 14 14 being all assembled and then galvanized as a whole before the terminal is put in service, the galvanizing tightly sealing all of the bolt-holes in the top plate 7 and thereby thoroughly protecting the interior portions of the cable terminal from any leakage or moisture which might come through the top plate 7 with other constructions. When the cable terminal is mounted in place as shown in Fig. 2, the inner side of the top plate 7 preferably rests against the heads of screws 30 30, and the outer edge of the circular plate 28 preferably fits the interior of the drum 1, so as to provide a strong and rigid support for the top portion of the cable terminal.

It will be noted that the cable terminal of this invention is constructed of sheet-metal parts throughout, all of the sheet-metal parts being of simple formation.

I do not wish to limit this invention to all of the particular details of construction as herein shown, as many modifications of same may be made without departing from the scope of the appended claims.

What I claim as my invention is:

1. A cable terminal comprising two concentric drum-shaped portions providing an annular space therebetween, top and bottom plates covering the ends of the annular space to form an annular inclosure, protective apparatus carried within the annular inclosure, insulators carried by the said top plate outside of the annular inclosure, means for accommodating cable conductors and aerial conductors leading to the annular inclosure, and suitable brackets carried by the said bottom plate for mounting the cable terminal in place, the outer said drum being movable to expose the protective apparatus when desired.

2. A cable terminal comprising two concentric drum-shaped portions providing an annular space therebetween, fixed plates closing the ends of the said annular space, protective devices carried within the said annular space, the outer drum-shaped portion being movable to expose the protective devices, and means for suitably mounting the whole in place.

3. A cable terminal comprising two concentric drum-shaped portions providing an annular space therebetween, the said annular space being closed at its ends, protective devices carried within the said annular space and mounted to the inner drum-shaped portion, the outer drum-shaped portion being movable relatively to the remainder of the terminal to expose the protective devices, and means for suitably mounting the whole in place.

4. A cable terminal comprising two concentric drum-shaped portions providing an annular space therebetween, the said annular space having its ends closed, protective devices carried within the annular space and mounted to the inner drum-shaped portion, the outer drum-shaped portion being movable to expose the protective devices, suitable guides for the movable drum-shaped portion, a distributing strip carried within the said annular space and mounted to one of the said guides, suitable means for leading cable conductors and aerial conductors into the said annular space, means for holding the movable drum-shaped portion in place, and means for suitably mounting the cable terminal.

5. A cable terminal comprising a circular disk carrying insulator knobs around its outer edge, two concentric drum-shaped portions extending below the circular disk to provide an annular inclosure for protective devices, suitable protective devices for the said annular inclosure, means for closing the lower end of the said annular inclosure, the outer drum-shaped portion being movable downward to open the said annular inclosure, an annular drip extending below the said circular disk and within the lower end of which the upper end of the outer drum-shaped portion extends when the latter is fully raised, and suitable means for holding the said outer drum-shaped portion in this raised position.

6. A cable terminal comprising two concentric drum-shaped portions providing an annular space therebetween, the said annular space having its ends closed, studs carried by the inner drum-shaped portion and extending into the said annular space for carrying protector units, suitable protector units adapted to be mounted on the said studs, and means for suitably mounting the cable terminal in place.

7. Means for mounting a cable terminal to a pole or suitable support, comprising a circular metal plate adapted to be secured to the top end of a pole or support, a drum-shaped portion having a disk covering one end thereof and adapted to be placed down over the said circular plate and the upper end of the pole or support, and suitable brackets at the lower portion of the drum-shaped portion to be mounted to the sides of the pole or support.

8. A cable terminal comprising a circular metal plate adapted to be secured to the top of a pole or support, a sheet-metal disk having a drum-shaped portion extending below same, suitable insulator knobs carried around the outer edge of the said sheet-metal disk, protective devices carried by the said drum-shaped portion, the said drum-shaped portion being adapted to be placed over the said circular metal plate and the upper end of the pole or support, and suitable brackets at the lower end of the drum-shaped portion to be mounted to the sides of the pole.

9. A cable terminal comprising a circular top plate carrying insulators around the outer edge thereof, a drum-shaped portion extending below the said top plate and adapted to carry protective devices as desired, whereby such protective devices are located below the said insulators, suitable protective devices mounted vertically around the said drum-shaped portion, a second drum-shaped portion outside of the protective devices for covering same and movable downward to expose the said protective devices, and suitable means for mounting the cable terminal to a pole or support.

10. A cable terminal comprising two concentric drum-shaped portions providing an annular space therebetween, the said annular space having its ends closed, means for suitably leading cable conductors and aerial conductors into the said annular space, and suitable protector units carried within the said annular space and mounted to the inner drum-shaped portion but spaced away from same so as to provide space between the said protector units and the drum-shaped portion for accommodating conductors leading around the drum-shaped portion, the outer drum-shaped portion being movable to expose the protector units as desired.

11. A cable terminal comprising a circular top plate carrying insulators around the outer edge thereof, two concentric drum-shaped portions extending below the top plate to provide an annular inclosure for protective apparatus, suitable protective apparatus for the annular inclosure, the said annular inclosure having its lower end closed, the outer said drum-shaped portion being movable downward to expose the protective apparatus when desired, an annular drip portion extending below the said top plate and within the lower edge of which the upper edge of the outer said drum-shaped portion extends when same is raised, the said drip portion being provided with a series of holes through which the aerial conductors extend from the said insulators to the protective apparatus within the said annular inclosure, the edges of the said holes being insulated.

As inventor of the foregoing I hereunto subscribe my name in the presence of two subscribing witnesses, this 30th day of October, 1907.

FRANK B. COOK.

Witnesses:
FREDERICK R. PARKER,
C. C. NEWBURN.